(12) United States Patent
Tsutsui

(10) Patent No.: US 11,997,506 B2
(45) Date of Patent: May 28, 2024

(54) AREA CONSTRUCTION METHOD

(71) Applicant: SoftBank Corp., Tokyo (JP)

(72) Inventor: Takashi Tsutsui, Tokyo (JP)

(73) Assignee: SoftBank Corp., Tokyo (JP)

( * ) Notice: Subject to any disclaimer, the term of this patent is extended or adjusted under 35 U.S.C. 154(b) by 355 days.

(21) Appl. No.: 17/244,967

(22) Filed: Apr. 30, 2021

(65) Prior Publication Data

US 2021/0250778 A1 Aug. 12, 2021

Related U.S. Application Data

(63) Continuation of application No. PCT/JP2019/039512, filed on Oct. 7, 2019.

(30) Foreign Application Priority Data

Nov. 5, 2018 (JP) ................. 2018-208065

(51) Int. Cl.
*H04W 16/18* (2009.01)
*H04W 16/28* (2009.01)

(52) U.S. Cl.
CPC ........... *H04W 16/18* (2013.01); *H04W 16/28* (2013.01)

(58) Field of Classification Search
CPC ..... H04W 16/18; H04W 16/28; H04W 16/20; H04B 7/0617
See application file for complete search history.

(56) References Cited

U.S. PATENT DOCUMENTS

| 6,640,089 | B1 * | 10/2003 | Kanaan | H04B 17/3913 455/67.11 |
|---|---|---|---|---|
| 2009/0219903 | A1 * | 9/2009 | Alamouti | H01Q 21/0031 342/372 |
| 2010/0291878 | A1 * | 11/2010 | Sato | H04W 16/18 455/67.11 |
| 2014/0091963 | A1 * | 4/2014 | Jung | G01S 7/40 342/173 |
| 2016/0149635 | A1 | 5/2016 | Hinman | |
| 2016/0255599 | A1 | 9/2016 | Shi | |

(Continued)

FOREIGN PATENT DOCUMENTS

| JP | H01158836 A | 6/1989 |
|---|---|---|
| JP | H1158836 A | 3/1999 |

(Continued)

OTHER PUBLICATIONS

Office Action issued for counterpart UK Application 2106231.0, issued by the Intellectual Property Office of UK dated Jul. 14, 2022.

(Continued)

*Primary Examiner* — Fred A Casca

(57) ABSTRACT

There is provided an area construction method for providing a 5G mobile wireless communication network service (hereinafter, referred to as a 5G service) using a millimeter wave, in which a wireless communication area is constructed by using line-of-sight propagation of a radio wave which is emitted by using a beam-forming technology from a base station, and rough surface scattering of the radio wave by a road surface, rather than by using a diffraction phenomenon of the radio wave which causes a large loss, and by using a U-shaped UE relay or CPE.

22 Claims, 18 Drawing Sheets

(56) References Cited

U.S. PATENT DOCUMENTS

| | | | |
|---|---|---|---|
| 2017/0195054 A1 | 7/2017 | Ashrafi | |
| 2018/0123692 A1* | 5/2018 | Leiba | H04B 10/808 |
| 2019/0037529 A1* | 1/2019 | Edge | H04B 7/0897 |
| 2019/0373485 A1 | 12/2019 | Kato | |
| 2021/0384946 A1* | 12/2021 | Mirzaee | H04B 7/0626 |

FOREIGN PATENT DOCUMENTS

| | | | |
|---|---|---|---|
| JP | H11163773 A | 6/1999 |
| JP | 2010157944 A | 7/2010 |
| JP | 2010268254 A | 11/2010 |
| JP | 2018033121 A | 3/2018 |
| WO | 2018168110 A1 | 9/2018 |
| WO | 2018175615 A1 | 9/2018 |

OTHER PUBLICATIONS

NTT DOCOMO Technical Journal, Special Issue on 5G Technology for services Implementation in 2020 (English Version), vol. 17, No. 4, Apr. 2016. Available at: https://www.docomo.ne.jp/english/binary/pdf/corporate/technology/rd/technical journal/bn/voll 7 4/voll 7 4 00len.pdf (The Japanese version is available at: https://www.docomo.ne.jp/binary/pdf/corporate/technology/rd/technical journal/bn/vol. 23 4/.

Search Report for counterpart UK Application No. 2106231.0, issued by the Intellectual Property Office of UK dated Dec. 22, 2022.

Office Action issued for counterpart UK Application 2106231.0, issued by the Intellectual Property Office of UK dated Sep. 30, 2022.

(ISA/237) Written Opinion of the International Search Authority for International Patent Application No. PCT/JP2019/039512, issued/mailed by the Japan Patent Office dated Dec. 17, 2019.

Kishiyama Yoshihisa et al., (online), Jan. 2016,pp. 6-48, (retrieved on Dec. 9, 2019) ,Internet URL:https://www.nttdocomo.eo.jp/binary/pdf/corporate/technology/rd/technical_journal/bn/vol.23_4/vol.23_4_000jp.pdf, non-officialtranslation (Kishiyama, Yoshihisa et al.Special Issue on SG Technology for services implementation in 2020. NTT DOCOMOTechnical Journal vol. 23 , No. 4 (on line).

Office Action issued for counterpart Japanese Application No. 2020-556699, issued by the Japanese Patent Office dated May 30, 2023 (drafted on May 25, 2023).

Kento Umeki, Mm-Wave Channel Model Considering Surrounding Wall Reflection for Outdoor Open Area Access Environments, IEICE Technical Report, Mar. 2017 vol. 116 No. 481, the Institute of Electronics, Information and Communication Engineers, Japan.

Kento Umeki et al. Mm-Wave Channel Model Considering Surrounding Wall Reflection for Outdoor Open Area Access Environments, IEICE Technical Report, Mar. 2017 vol. 116 No. 481, the Institute of Electronics, Information and Communication Engineers, Japan.

* cited by examiner

AREA CONSTRUCTION METHOD

The contents of the following Japanese and PCT applications are incorporated herein by reference:
NO. 2018-208065 filed in JP on Nov. 5, 2018 and
NO. PCT/JP2019/039512 filed in WO on Oct. 7, 2019

BACKGROUND

1. Technical Field

The present invention relates to an area construction method and a service method which are characterized in that a 5G (5th Generation) of a millimeter wave band is used and a diffraction phenomenon band is fundamentally not used.

2. Related Art

In the 5G, a communication using a frequency band of a millimeter wave such as a 28 GHz band has been studied (for example, refer to Patent Document 1).

Utility poles are installed every several tens of meters, and thus are convenient for constructing street cells; however, these days, there is a problem in the future development of the utility poles due to undergrounding. The millimeter wave has high straightness, and very poor propagation due to diffraction, and thus for the millimeter wave, it is necessary that a cell radius is smaller than that between base stations in the related art and that the station is installed at high density, for example, every 20 meters, to construct a coverage area similar to that of the related art, which causes a huge cost.

Currently, a steering antenna with a high gain is being developed in each country; however, in a case of being mounted in a mobile terminal, a gain is not stable and a wireless link is difficult to establish in comparison with a case of being used in a fixed installation. On the other hand, by using the steering antenna with a high gain, which is difficult to use effectively in the mobile terminal, for a U-shaped UE (User Equipment) relay or CPE (Customer Premises Equipment) as an FWA (Fixed Wireless Access) device, it is possible to establish the wireless link by using a rough-surface-scattered wave, a reflected wave, and the like, from a rough wall surface (hereinafter referred to as a rough wall surface) such as a road surface or a masonry wall surface, and it is possible to set, as a coverage area, a floor where the U-shaped UE relay or the CPE is installed, and, for example, to construct a coverage area with a capacity of approximately 10 Gbps per floor.

CITATION LIST

Patent Document

[Patent Document 1] Japanese Patent Application Publication No. 2018-033121

Technical Problem

A millimeter wave has a shorter wavelength (1 cm or less) than a wavelength (30 cm and 12 cm) of a radio wave that has been used for a cellular communication in the related art, and has a large loss due to diffraction, therefore when a station installation is designed by using a macro station installation similar to that of a cellular base station in the related art, only an area in a line of sight can be used, and a shadow or the like of a building cannot be used as a coverage area, and thus stations for street cells have to be installed every 20 meters for a 5G service, which requires a huge amount of CAPEX (Capital Expenditure) and OPEX (Operating Expenditure). In an embodiment of the present invention, for example, by minimally installing an inexpensive base station device of a GOB (Grid Of Beams) method, by actively using line-of-sight propagation, and by using rough surface scattering by a road surface and a rough wall surface, the coverage area can be set to minimize the CAPEX and the OPEX.

In a communication using the millimeter wave, the wavelength is short, and thus the diffraction loss at an edge or the like of a building is large and it is difficult to achieve a penetration of a service outside the line of sight. Therefore, an area where a 5G communication using the millimeter wave can be used is limited. As a countermeasure against this problem, a method, in which the rough surface scattering by the road surface and the rough wall surface, a U-shaped UE relay, CPE, or the like, are used to set the coverage area, is used as described above. In general, for a terminal, a direction of arrival of the radio wave as the scattered wave from the road surface or the like is not determined, and an effective directional antenna cannot be easily installed; however, by a U-shaped UE relay or CPE side being fixedly installed and having a steerable antenna with a high gain, the rough-surface-scattered radio wave by the road surface and the rough wall surface can be received, and thus the communication is possible.

When a base station is installed in an urban building area, and an antenna pointing direction of the base station is oriented toward a direction of a road extension or is oriented close to horizontal, in a case where the radio wave in a Sub 6 GHz band is used, the radio wave may be propagated also outside the line of sight of the shadow of the building due to the diffraction phenomenon, and may cause interference with a radio wave emitted from another base station also at a time of using the terminal at a height of the ground; however, in a case where the radio wave of 28 GHz is used, attenuation due to the diffraction at a building angle is large, and thus an effect of a diffracted wave is small, and further, radio wave interference between cells is hardly a problem in comparison with a case where the terminal has an antenna with a high gain about 10 dBi. On the other hand, Sub 6 GHz is a low frequency, and thus cannot be used for a steerable antenna having a sufficient gain for a portable antenna.

In using the millimeter wave, a propagation loss is great, it is very difficult even to set an indoor window area as the coverage area, and it is very hard even to receive, at the window area, the millimeter wave as a semi-LOS wave such as a direct wave or the road-surface-scattered wave. In an office or the like, even when the UE relay is installed just away from the window area indoors, the radio wave does not reach due to a metal venetian blind. Therefore, it is conceivable to install the UE relay on an outside of window glass; however, in that case, a method of supplying power to the relay device is a problem (because many buildings do not have power outlets or the like installed on balconies or the like outside windows). On the other hand, on an inside of a condominium or the like, when a station is installed on a rack, a cupboard, or the like so as to receive the direct wave, it is possible to establish a link to the UE relay or the CPE.

Further, when the window glass is not special glass such as a glass with an electric heating wire, an additional penetration loss is approximately 10 dB, and thus the UE relay is likely to be installed at the indoor window area; however, when there is a blind in the window, it is conceivable that the blind causes a further additional penetration loss and that it is not possible to establish a stable wireless link with the base station. Therefore, it is necessary to contemplate installing an antenna for connecting to a base station side (so-called a donor antenna) between the window and the blind, and installing an antenna for covering an indoor side (so-called a service antenna) on the indoor side further than the blind, or the like. However, such an antenna installation causes a problem that wiring work or the like of an antenna cable becomes complicated.

To solve these problems, by making the UE relay be U-shaped, and installing the metal blind to be inserted into a U-shaped recess surface, it is possible to easily realize a formation in which without the complicated wiring work of the antenna cable, the donor antenna is installed between the blind and the window, and the service antenna is installed on the indoor side of the blind.

When an antenna with a high gain is used for a mobile terminal, the direction of arrival of a beam from the base station frequently changes due to a movement of a reflective object or the like (for example, cars and people) existing in front of the building, and the wireless link is very unstable. Therefore, when the antenna with a high gain is attached, the wireless link may be rather easily broken. As means for handling such a change in the direction of arrival of the beam, a beam steering method using the steerable antenna with a high gain is known. However, for handheld mobile terminals or the like such as so-called smartphones, due to a condition required for those terminals such as a small size and mobility, even when the antenna with a high gain is provided to handle a steerable beam, it is rather difficult to be effective.

A stationary terminal such as the U-shaped UE relay or the CPE is comparatively easily provided with the steerable antenna with a high gain, and when the U-shaped UE relay or the CPE is installed at the window area in a third floor to a fourth floor or higher in the building to avoid obstacles such as people, cars, and trees near the building, even in a case where there is no line-of-sight environment between the antenna and the base station, an efficient and stable wireless link can be established by orienting, by using a steering function, a peak direction of the antenna, for example, toward the road surface, the rough wall surface, or the like which is in the line of sight and causes the rough surface scattering.

By changing a way of thinking in the related art to focus on installing terminals of the U-shaped UE relay or the CPE in a middle floor or higher in the building which is not affected by a moving object and an obstacle in front of the building, as described above, rather than focusing on terminals of the U-shaped UE relay or the CPE in a roadside store to realize ground floor coverage, it is possible to establish a stable wireless link to a donor base station by using a beam formed by using the direct wave, a reflected wave, or the rough-surface-scattered wave by the road surface, the rough wall surface, or the like and thus to establish a stable service area.

GENERAL DISCLOSURE

An aspect of the present invention provides an area construction method for providing a 5G mobile wireless communication network service (hereinafter, referred to as a 5G service) using a millimeter wave. In the area construction method, a wireless communication area may be constructed by using line-of-sight propagation of a radio wave which is emitted by using a beam-forming technology from a base station, and rough surface scattering of the radio wave by a road surface and a rough wall surface of masonry or the like, rather than by using a diffraction phenomenon which causes a significantly large loss in the millimeter wave. In the area construction method, an outdoor coverage area may be constructed by the radio wave which is propagated through paths of the line-of-sight propagation of a beam aligned in a road direction, specular reflection and the rough surface scattering by the road surface and a building wall surface; and an indoor coverage area may be constructed by the radio wave which is propagated by the line-of-sight propagation, the specular reflection, and the rough surface scattering being reflected or scattered in a direction to an inside of a building.

In the area construction method, the radio wave with a beam shape may be emitted by a GoB (Grid of Beam) method from the base station in a direction of a road extension, the radio wave reflected or scattered in the direction to the inside of the building of a roadside via the line-of-sight propagation of the radio wave, the specular reflection and the rough surface scattering of the radio wave by the building wall surface and the road surface may be received by a U-shaped UE relay or CPE that is installed at a window area of the building and that is equipped with a beam steering antenna, and the UE relay or the CPE may be operated as a WiFi access point, a 5G base station, or an LTE (Long Term Evolution) base station, thereby constructing the indoor coverage area, and the U-shaped UE relay or the CPE may include UE of a millimeter wave 5G and Sub 6 GHz by a window side, and include a WiFi antenna or a femto base station with a 4G or 5G function on an inside on an opposite side, with the U-shape being to avoid an influence of a metal venetian blind.

The area construction method may be an area construction method in which, in order to provide the 5G service using the millimeter wave for the insides of middle floors and upper floors in a high-rise building, a direct wave of the millimeter radio wave is radiated to the high-rise building from a location away from the high-rise building by a predetermined distance or longer, thereby causing the radio wave to penetrate the inside of the building by using a U-shaped UE relay or CPE.

The area construction method may be an area construction method in which a beam of the radio wave of a millimeter wave band is radiated toward a road surface or the rough wall surface by using a beam-forming function of the base station according to a 5G specification to realize indoor coverage by using a direct wave from the base station, or a U-shaped UE relay or CPE installed indoors, by causing the radio wave to enter into a building through an open window of a store on a roadside by using a property that the millimeter wave is rough-surface-scattered by the road surface or the rough wall surface.

The road surface is asphalted, and a maximum size of a coarse aggregate included in an asphalt mixture constituting an asphalt pavement of the road surface is 20 mm, and the area construction method may be an area construction method in which the radio wave in a frequency bandwidth higher than a 28 GHz band, is intentionally applied, in a frequency range that does not exceed an application limit of a CMOS used for a power amplifier of the base station, to the asphalt road surface to be scattered by the rough surface, and constitutes a donor to UE or CPE to construct a coverage area.

The area construction method may be an area construction method in which the base station outputs a radio wave in at least any bandwidth of 66 GHz band, 76 GHz band, 80 GHz band, or 90 GHz band.

The area construction method may be an area construction method in which a coverage area in a LOS (Line of Sight) or a semi LOS is constructed by emitting a beam, by a GoB method, from the base station installed at a high location of a building toward a direction of a road extension to ensure the LOS without using street propagation. The area construction method may be an area construction method, which is of a scheme that is completely different from a typical repetitive three-sector station installation in which the base station is installed in a building; and the base station installed in the building located at a crossroad has a sector configuration of two sectors or four sectors in a direction of a road extension, and the base station installed in a building located at a three-way junction has a sector configuration of three sectors.

The area construction method may be an area construction method in which in setting an area to be a target coverage area, an urban center where there are many tall buildings, a vicinity of the urban center, or a super rural area where trees are not planted are set as a target, and a suburban region is not set as the target coverage area.

The area construction method may be an area construction method in which when the radio wave is emitted from the base station toward a high-rise building, a range of a beam emitted from the base station is selected in accordance with a shape of the high-rise building so as not to cause interference to a satellite space station and an earth station.

The area construction method may be an area construction method in which a station installation design method which ensures maximum coverage is used, in which, when a common channel beam pattern of a base station is formed, by a beam design method that sets a beam to all points in a line of sight, other than midair, regardless of a building wall surface, a road surface, or a building roof top surface, based on a view photo taken from the base station at a time of installing the base station, a rough-surface-scattered wave and a specularly reflected wave by the road surface or the rough wall surface are added to a U-shaped UE relay or CPE including a beam steering antenna with a high gain, or the U-shaped UE relay or the CPE including a receive-only beam steering antenna with a higher gain.

The area construction method may be an area construction method in which a stable link budget is ensured by using rough surface scattering by a road surface, a reflected wave by a building, and the like far away (being far away makes it possible to target a wide area in a pinpoint manner), by using a Down Link only link which is predicted to be specified in the future by Release 17 of 3GPP or the like, and by using a U-shaped UE relay or CPE including a receive-only beam steering antenna with a higher gain (30 dBi or the like).

The area construction method that uses the UE relay may be an area construction method in which by using an LTE or 5G system of 3.6 GHz to 4.2 GHz, which is said to be difficult to use in a wide range outdoors due to a problem of interference with satellite communication, for a frequency of the radio wave which is output to an indoor service side of the UE relay, compatibility with the satellite communication is enabled.

The area construction method may be an area construction method in which when a street tree is planted between a building and a road that are target coverage areas, a second floor to a fourth floor of the building are not set as the target coverage areas, and the rough-surface-scattered radio wave by the road surface or the rough wall surface, or the radio wave propagating in the line of sight is incident only on other floors, thereby ensuring a communication between a UE relay or CPE installed in the building, and the base station.

The area construction method may be an area construction method in which when a donor side and a service side use the same frequency, the UE relay causes a HetNet (Heterogeneous Network) function to be operated to avoid a radio wave interference between the donor side and the service side.

The area construction method may be an area construction method in which decluttering is executed, in which, at an urban center, a busy main street is covered vertically and horizontally in a grid pattern, and other than a building facing a street that is a target coverage area, no area is set as a coverage area, in principle.

The area construction method may be an area construction method in which when there is an outdoor space such as a balcony in a residential or small office condominium, the UE relay has a beam steering antenna on an outside of a U-shape of a flower-pot type UE relay having a shape to be hooked on a handrail.

The area construction method may be an area construction method in which when the U-shaped UE relay or the CPE is to be placed in a residential or small office condominium, a customer performs installation by themself at a place where a strength of a received radio wave of the U-shaped UE relay or the CPE is the strongest either by directly using the radio wave, which is emitted from the base station to enter through a window of the condominium, or by using the fact the radio wave is reflected once by Lambertian reflection on a ceiling of a room.

The area construction method may be an area construction method in which a station installation is designed to also include beams directly incident on middle floors and upper floors of a building without tilting the beams down even when the radio wave is emitted toward a direction of a road extension, rather than being designed to set only the feet of the base station as a coverage area.

The area construction method may be an area construction method in which the base station fundamentally has a two sector configuration, but when a beam is emitted to middle floors or upper floors of a building as a target, a three sector configuration having one sector targeting the middle floors or the upper floors added in addition to the two sectors is adopted, and the building is irradiated in two or three directions from a vicinity, thereby setting an inside of the building as a coverage area, while the beam is not oriented in a direction that is not a direction in which the building is standing so that a continuous coverage area is not constructed.

The area construction method may be an area construction method in which coverage is calculated only in consideration of a target area since a 28 GHz band is characterized in that a suburban region and an area outside the line of sight such as a narrow back road are not set as the target area, which makes it necessary to change a way of thinking about the coverage in a conventional frequency band of 6 GHz or less.

The area construction method may be an area construction method in which the radio wave, which is emitted from the base station, is reflected once or twice by a wall surface of a building to reach an area outside the line of sight, and is received by a U-shaped UE relay or CPE with a beam oriented in an upward direction above a horizon, thereby reducing effects of a car and a pedestrian traveling on the ground to enhance a quality of a communication.

The summary clause does not necessarily describe all necessary features of the embodiments of the present invention. The present invention may also be a sub-combination of the features described above.

DESCRIPTION OF EXEMPLARY EMBODIMENTS

Hereinafter, the invention will be described through embodiments of the invention, but the following embodiments do not limit the invention according to claims. In addition, not all the combinations of features described in the embodiments are essential for means to solve the problem in the invention.

Figure 1:
FIG. 1 schematically shows an example of installation environments of a plurality of base stations 100 in a system 10 according to the present embodiment.

FIG. 1 schematically shows an example of installation environments of a plurality of base stations 100 in a system 10 according to the present embodiment. The system 10 according to the present embodiment can execute various area construction methods for constructing a wireless communication area.

The base station 100 is, for example, installed on an outside of a building such as a rooftop of the building, a wall surface of the building, or the like. A place where the base station 100 is installed is not limited to buildings, and the base station 100 may be installed at any place. For example, the base station 100 is installed on a utility pole or the like.

In the example shown in FIG. 1, the base station 100 emits, by using a beam-forming technology, a beam 102 of a millimeter wave along a direction of a road extension to form a communication area. A frequency band of the beam 102 emitted by the base station 100 may be any frequency band as long as the millimeter wave is used.

The base station 100 emits, for example, the beam 102 of a radio wave in a 28 GHz band. Further, the base station 100 emits, for example, the beam 102 of a radio wave from a 60 GHz band to an 80 GHz band. The base station 100 may emit the beam 102 of a radio wave in a 66 GHz band. The base station 100 may emit the beam 102 of a radio wave in a 76 GHz band. The base station 100 may emit the beam 102 of a radio wave in an 80 GHz band.

FIG. 1 shows an example in which a main road is set as a communicable area by using the plurality of base stations 100, for example, to cover busy downtown such as central Tokyo where people are crowded. The system 10 according to the present embodiment can adopt an area construction method in which decluttering is executed in which at the urban center, a busy main street is covered vertically and horizontally in a grid pattern, and other than a building facing a street that is a target coverage area, no area is set as a coverage area, in principle. Further, the system 10 according to the present embodiment can adopt an area construction method in which in setting the area to be the target coverage area, the urban center where there are many tall buildings, a vicinity of the urban center, and a super rural area where trees are not planted are set as the target, and a suburban region is not set as the target coverage area.

Figure 2:
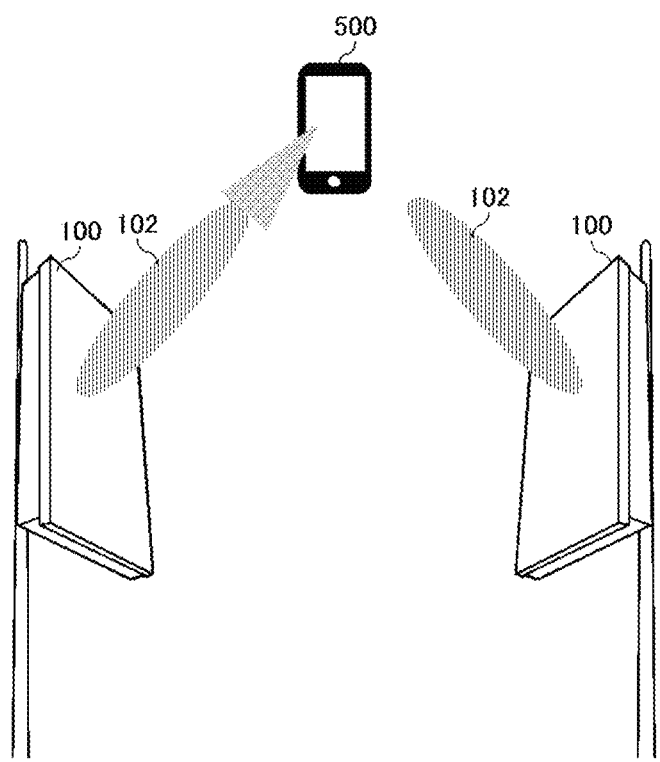
FIG. 2 schematically shows an example of a beam selection function using a steering antenna in a UE 500.

FIG. 2 schematically shows an example of an interference cancellation function of a UE 500. The UE 500 has a plurality of antennas. The number of antennas of the UE 500 may be any number, and is, for example, four. The UE 500 sets, to an appropriate angle, a phase of the radio wave which is received by each of the plurality of antennas by a phase shifter at a preset offset, and selects a preset for maximizing a desired strength of the radio wave. This function has been developed for a mobile terminal, but is rather effectively used for a UE relay or CPE since a fixed point installation makes it possible to keep a sufficient distance from a radio-wave-reflecting surface and a scattering surface, while in a case of being equipped in the mobile terminal, on the contrary, a stable gain cannot be obtained. Thereby, for example, even in a place where the radio waves, which are emitted by the base station 100, arrive from multiple directions such as an intersection in the environment as shown in FIG. 1, the radio waves do not interfere with each other, and it is possible to receive only the desired radio wave with a high quality.

Figure 3:
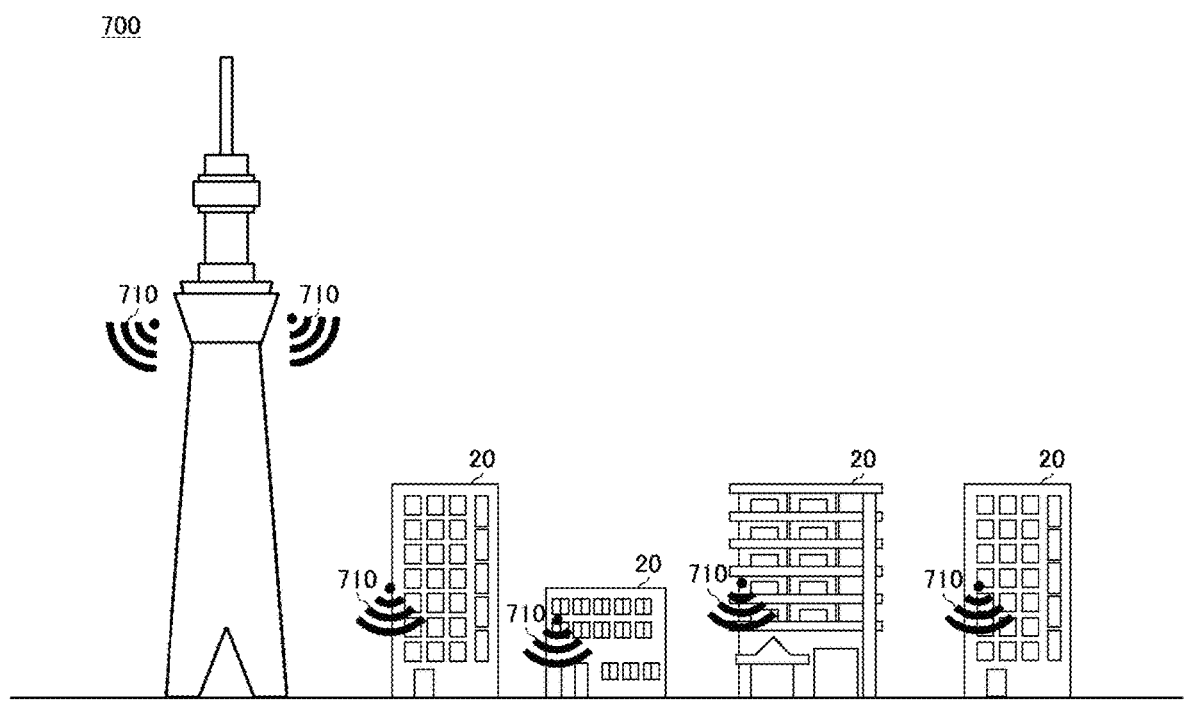
FIG. 3 schematically shows an example of a millimeter wave network 700 devised so far.
Figure 4:
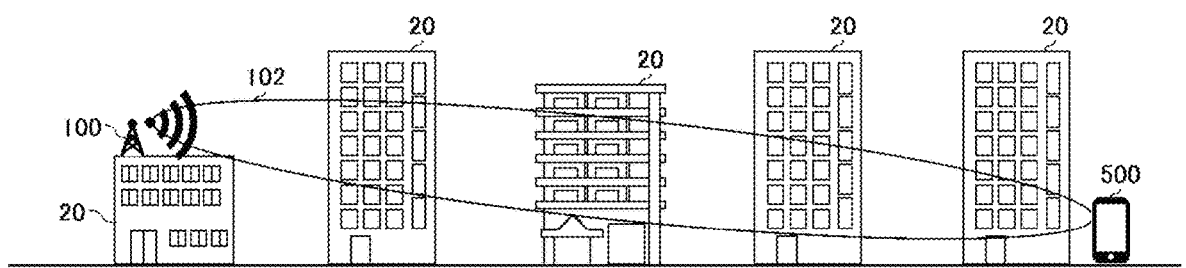
FIG. 4 schematically shows an example of a millimeter wave network realized by the system 10 according to the present embodiment.

FIG. 3 schematically shows an example of a millimeter wave network 700 devised so far. FIG. 4 schematically shows an example of a millimeter wave network realized by the system 10 according to the present embodiment. A difference between the millimeter wave network 700 devised so far, and the millimeter wave network realized by the system 10 according to the present embodiment will be described with reference to FIG. 3 and FIG. 4.

As shown in FIG. 3, the millimeter wave network 700 devised so far sets a wide range to be communicable by emitting a radio wave 710 downward from a building 20 or a building exceeding an average building height. When a plurality of base stations emit radio waves 710 from directly above, as in the millimeter wave network 700, heavy inter-cell interference occurs.

In contrast to that, as shown in FIG. 4, the millimeter wave network realized by the system 10 according to the present embodiment mainly sets only a roadside of the main road to be the communicable area by emitting the millimeter radio wave at an angle close to horizontal from the base station 100 installed at a height which is the same as or lower than an average building height. The system 10 according to the present embodiment enables a communication over a long distance by setting only a roadside as the coverage area to concentrate energy, which spreads to an area where there is no communication demand, into the roadside where the communication demand is comparatively high.

In the millimeter wave network 700 devised so far, the plurality of base stations are installed to cover the area as shown in FIG. 3, and the heavy inter-cell interference also occurs; however, with the system 10 according to the present embodiment, the area as shown in FIG. 4 is covered by one base station 100, and the interference does not occur.

Figure 5:
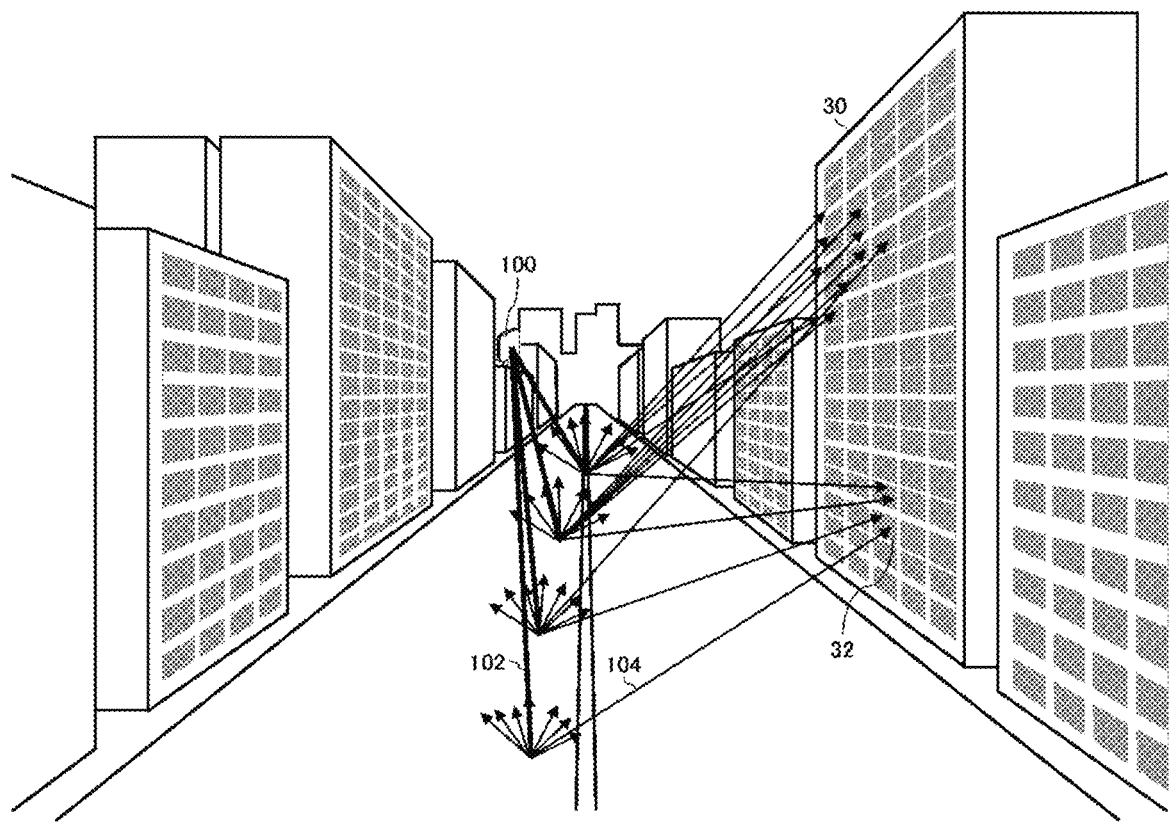
FIG. 5 schematically shows an example of a method of setting an indoor area to be communicable by using scattering of a radio wave by a rough surface.

FIG. 5 schematically shows an example of a method of setting an indoor area to be communicable by using scattering of a radio wave by a rough surface. The beam 102 of the millimeter wave emitted from the base station 100 is, for example, scattered by unevenness of asphalt on the ground, and a scattered radio wave 104 reaches a building 30, indoors, of the roadside through a window 32 of the building 30.

At a frequency of 6 GHz or less which has been used so far for the communication, when a beam is radiated in the direction of a road extension, energy scattered by the rough surface such as the road and a rough wall surface is small, a main component is due to reflection, and the radio wave is not reflected in a direction other than a direction in which an incident angle and a reflection angle of the radio wave are the same, and thus the radio wave hardly reaches indoors. However, in the millimeter wave, the energy scattered by the rough surface is large, and reaches indoors in a state in which the entire energy, scattered by the road, the rough wall surface, and the like in their entirety is integrated. Note that the reflection component is not negated, but is added to the energy due to the scattering to be received.

The base station 100 may construct an outdoor coverage area by the radio wave which is propagated mainly through paths of line-of-sight propagation of the beam 102 aligned in a road direction, and specular reflection and rough surface scattering by a road surface, a building wall surface, and the like. Further, the base station 100 may construct an indoor coverage area by the radio waves which are propagated by the line-of-sight propagation of the beam 102 aligned in the road direction, and the specular reflection and the rough surface scattering by the road surface, the building wall surface, and the like, being reflected or scattered in a direction to the inside of the building.

The road that is a target to which the base station 100 emits the beam 102 of the millimeter wave may be any road. The road may be asphalted. A size of a coarse aggregate included in an asphalt mixture constituting an asphalt pavement is, for example, 13 mm in an upper layer portion, and 20 mm in a middle layer portion and a lower layer portion. The road may be a road in which a porous asphalt mixture is adopted as an asphalt mixture. In the road, a filler or a fine aggregate may be peeled off due to deterioration. For the filler, at the top of the road, which is around 5 mm, the radio wave with a wavelength lower than or equal to the size is considered to facilitate the rough surface scattering by the road surface.

The base station 100 intentionally applies the radio wave in a frequency bandwidth higher than the 28 GHz band, in a frequency range that does not exceed an application limit of a CMOS (Complementary Metal Oxide Semiconductor) used for a power amplifier, to the road surface or the rough wall surface to be scattered by the rough surface, and to constitute a donor to the UE and CPE, so that the coverage area is constructed.

Figure 6:
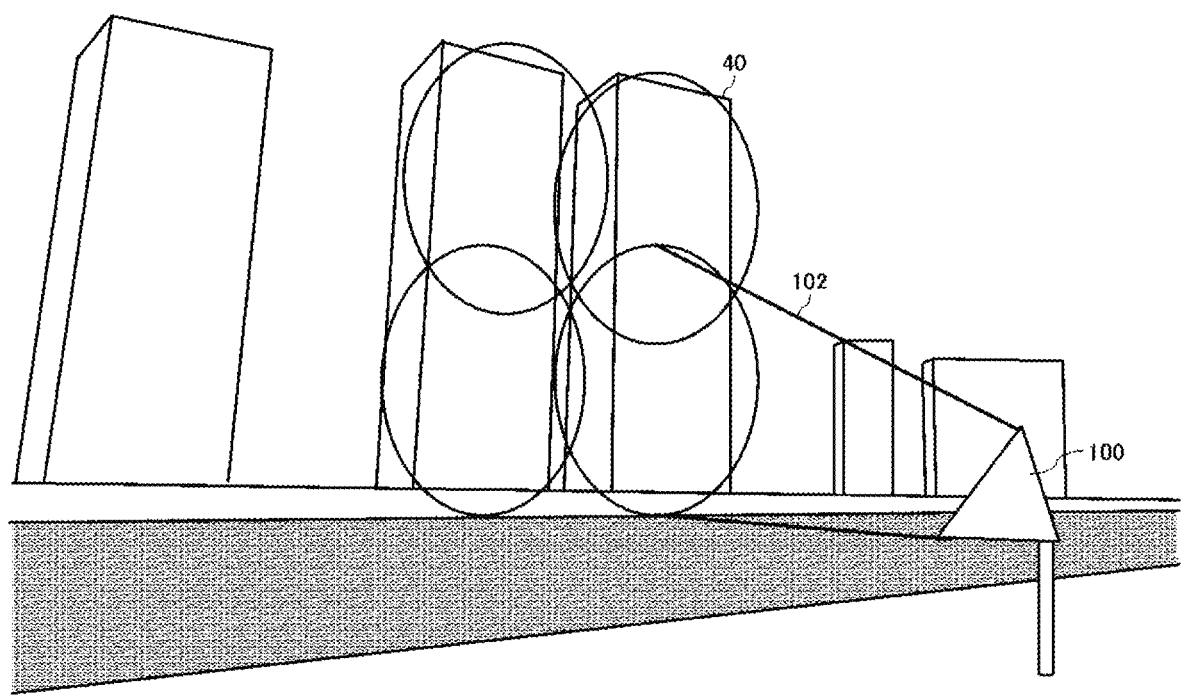
FIG. 6 schematically shows an example of a method of setting an indoor area to be communicable in a high-rise building.

FIG. 6 schematically shows an example of a method of setting an indoor area to be communicable in a high-rise building. Here, a case in which for a condominium 40 standing along a riverside, a base station 100 is installed on a bank on an opposite side of the river from the condominium 40 to set an inside of the condominium 40 to be communicable is illustrated. The base station 100 emits the beam 102 of the millimeter wave toward the condominium 40. The beam 102 can penetrate the inside of the condominium 40 through a window of the condominium 40. This makes it possible to directly provide an indoor communication service. Note that the base station 100 may be installed on a bank on a condominium 40 side of the river rather than on the bank on the opposite side of the river from the condominium 40.

Figure 7:
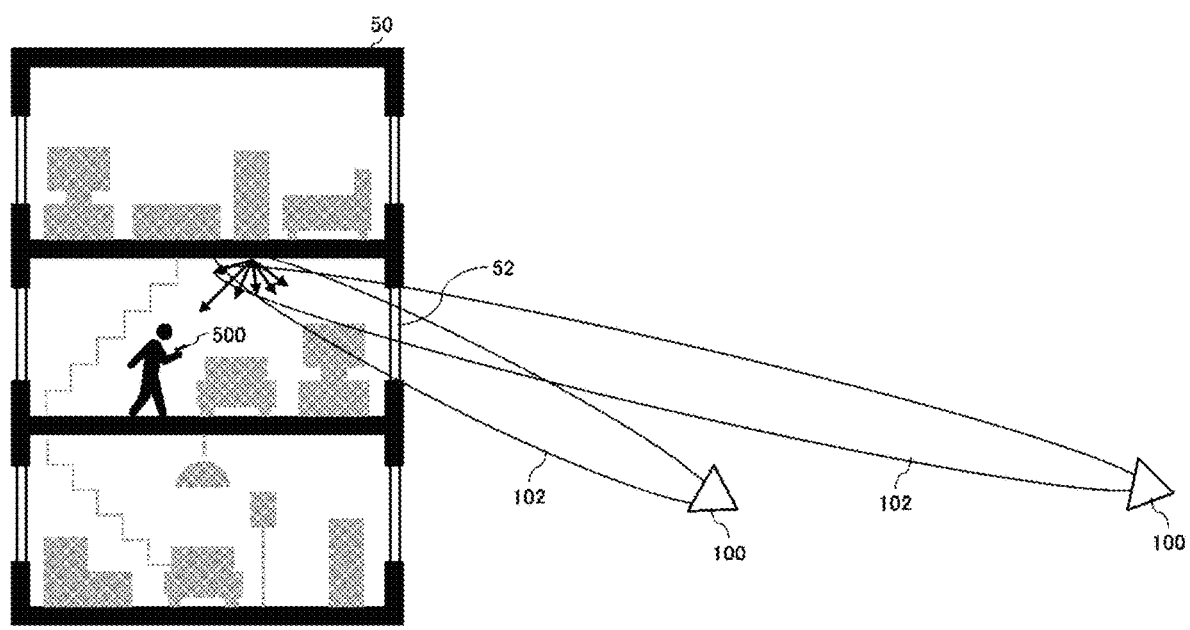
FIG. 7 schematically shows an example of a method of forming an indoor communication area in a building 50 by a base station 100.

FIG. 7 schematically shows an example of a method of forming an indoor communication area in a building 50 by a base station 100. The base station 100 is installed far away from the building 50. The base station 100 may be installed at a location away from the building 50 by a predetermined distance or longer. The base station 100 is installed at any place away from the building 50 by a predetermined distance or longer. The beam 102 emitted by the base station 100 installed at any place reaches an inside of the building 50 through a window 52 of the building 50. The beam 102 that has reached the inside of the building is reflected and scattered by a ceiling, a wall, or the like, and is received by the UE 500.

In this way, by directly radiating the millimeter radio wave to the high-rise building from the location away from the high-rise building by a predetermined distance or longer to provide a 5G service using the millimeter wave for insides of middle floors and upper floors in the high-rise building, the base station 100 may cause the radio wave to penetrate the inside of the building.

Figure 8:
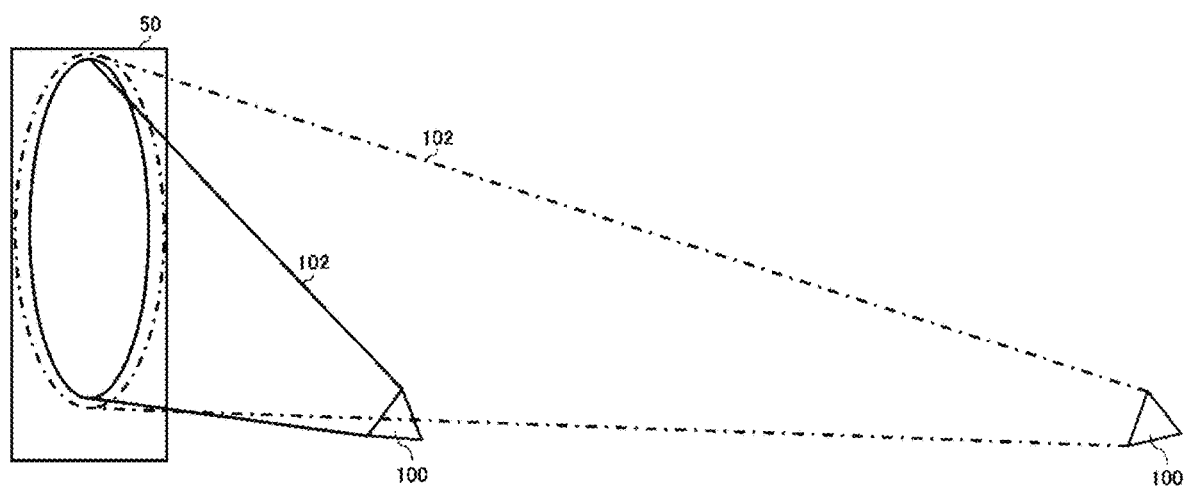
FIG. 8 shows an example of a beam 102 emitted by the base station 100 toward the building 50.

FIG. 8 shows an example of a beam 102 emitted by the base station 100 toward the building 50. The base station 100 may control the beam 102 such that the beam 102 does not miss the building 50 regardless of the location where the base station 100 is arranged with respect to the building 50.

Figure 9:
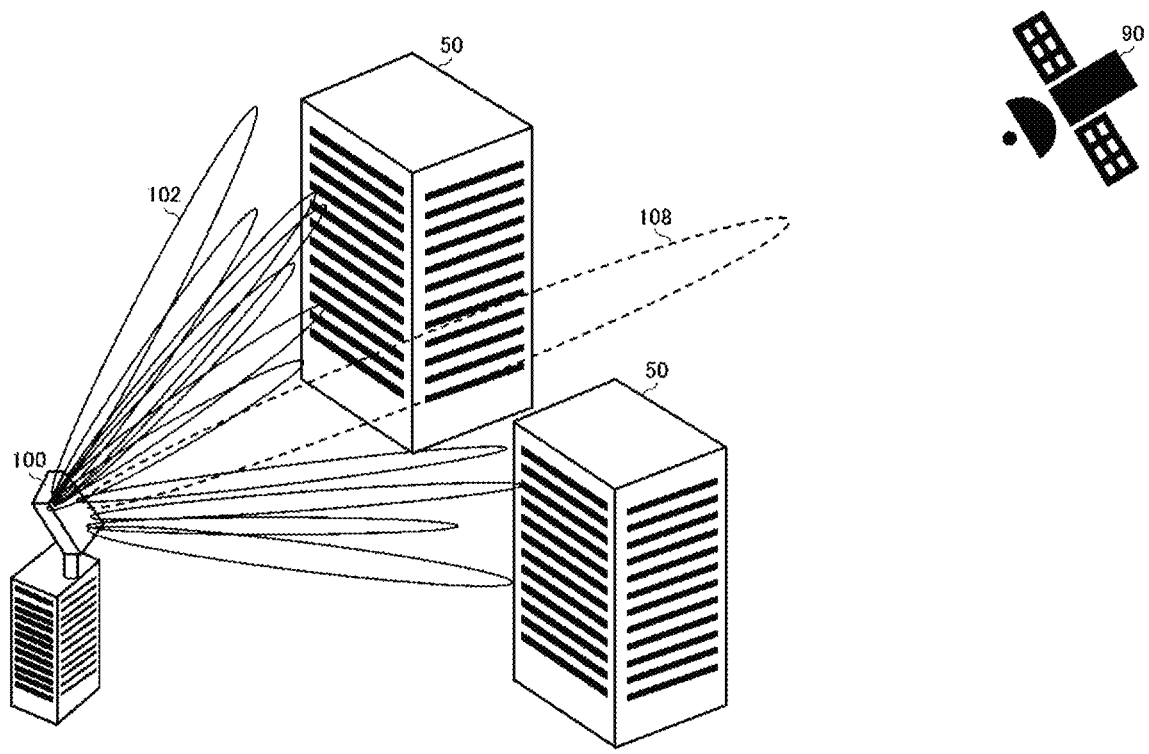
FIG. 9 schematically shows an example of a method in which the base station 100 irradiates the high-rise building with the radio wave.

FIG. 9 schematically shows an example of a method in which the base station 100 irradiates the high-rise building with the radio wave. In order to avoid the interference to a satellite space stations or an earth station that uses an adjacent frequency, for example, the base station 100 may determine a beam to use and a beam not to use in accordance with a shape of the building 50 to be irradiated with the radio wave when forming the beam. In the example shown in FIG. 9, the base station 100 may determine, as the beam not to use, a beam 108 in a direction to a satellite space station 90.

Figure 10:
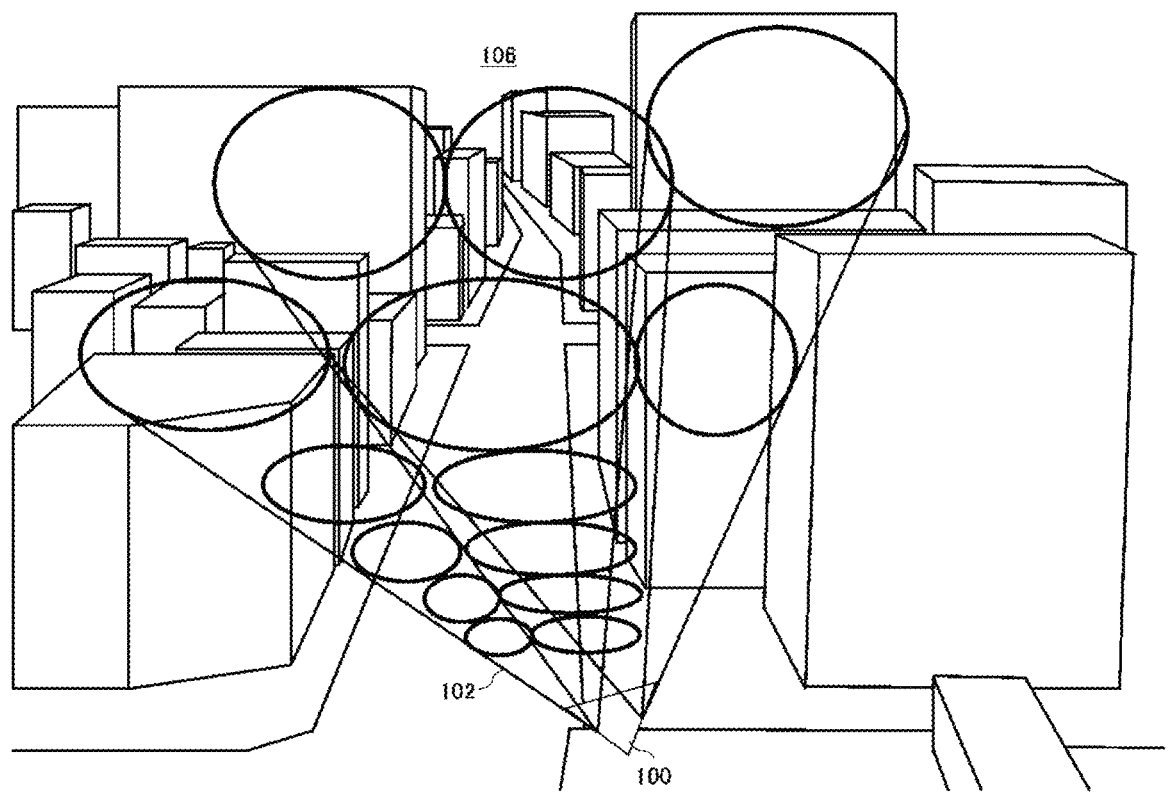
FIG. 10 schematically shows an example of a beam pattern 106 emitted from the base station 100.

FIG. 10 schematically shows an example of a beam pattern 106 emitted from the base station 100. The base station 100 does not perform a particularly difficult control, and first sweeps the beam according to a predetermined beam grid. This makes it possible to radiate the radio wave to the building, the high-rise building, and the road located in front of the base station 100.

Figure 11:
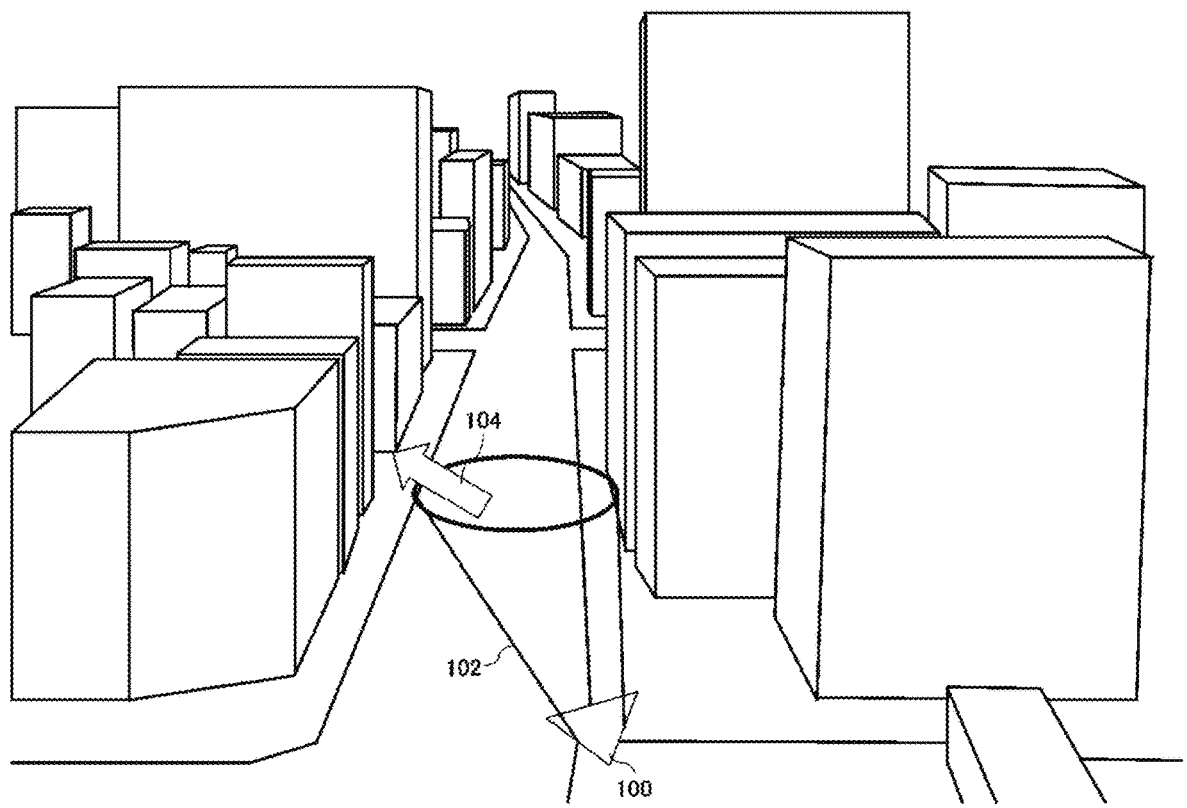
FIG. 11 schematically shows an example of a method in which the radio wave is scattered by a road surface, and reaches lower floors of a building to provide a service.

FIG. 11 schematically shows an example of a method in which the radio wave is scattered by a road surface, and reaches lower floors of a building to provide a service. The beam 102 emitted from the base station 100 is, for example, scattered by the asphalt of the road, and reaches the lower floors of the building to provide a high speed communication service for an inside of a coffee shop or the like adjacent to the roadside.

Figure 12:
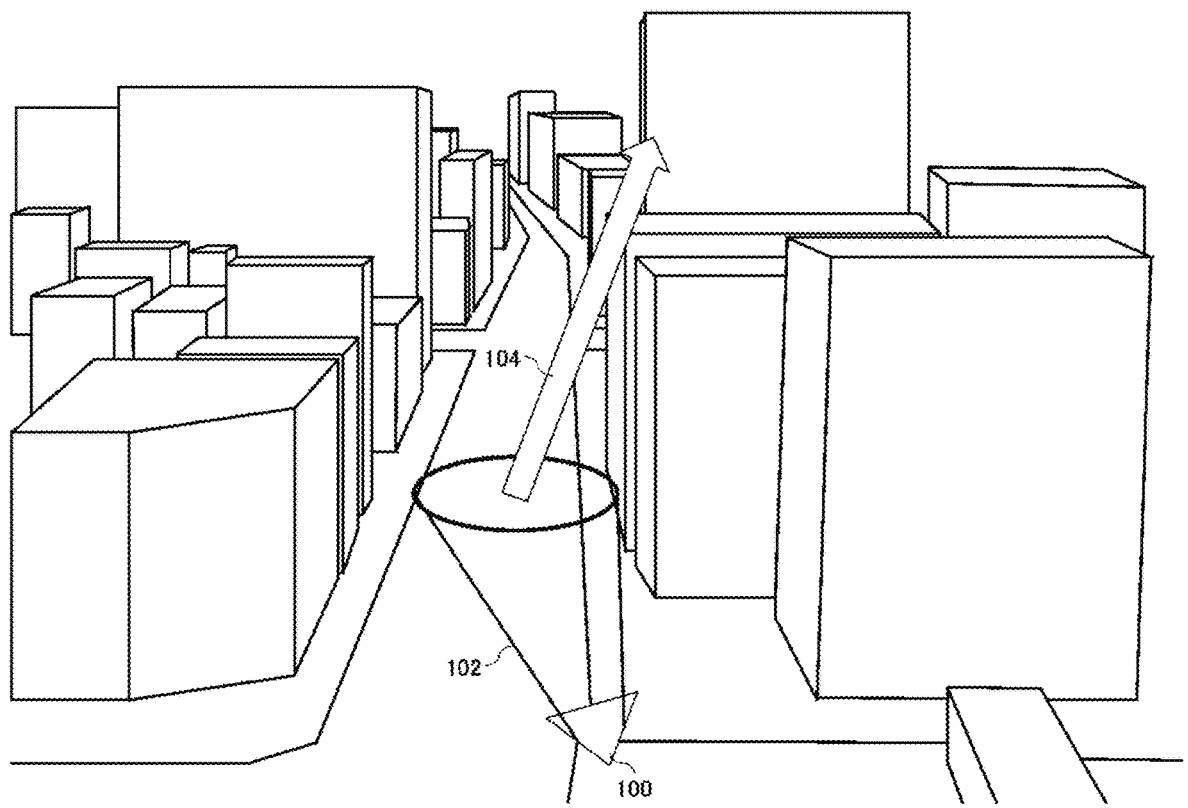
FIG. 12 schematically shows an example of a method in which the radio wave is scattered by the road surface, and reaches middle floors of a building to provide a service.

FIG. 12 schematically shows an example of a method in which the radio wave is scattered by the road surface, and reaches middle floors of a building to provide a service. The beam 102 emitted from the base station 100 is, for example, scattered by the asphalt of the road, and the radio waves scattered in the wide range are integrated to penetrate indoors through a window of the middle floors of the building to provide an indoor high speed communication service. At this time, a communication terminal, a relay device, and the like, installed at a window area of the building may orient pointing directions of the antennas toward a road surface direction so as to be able to receive the scattered radio wave most efficiently.

Figure 13:
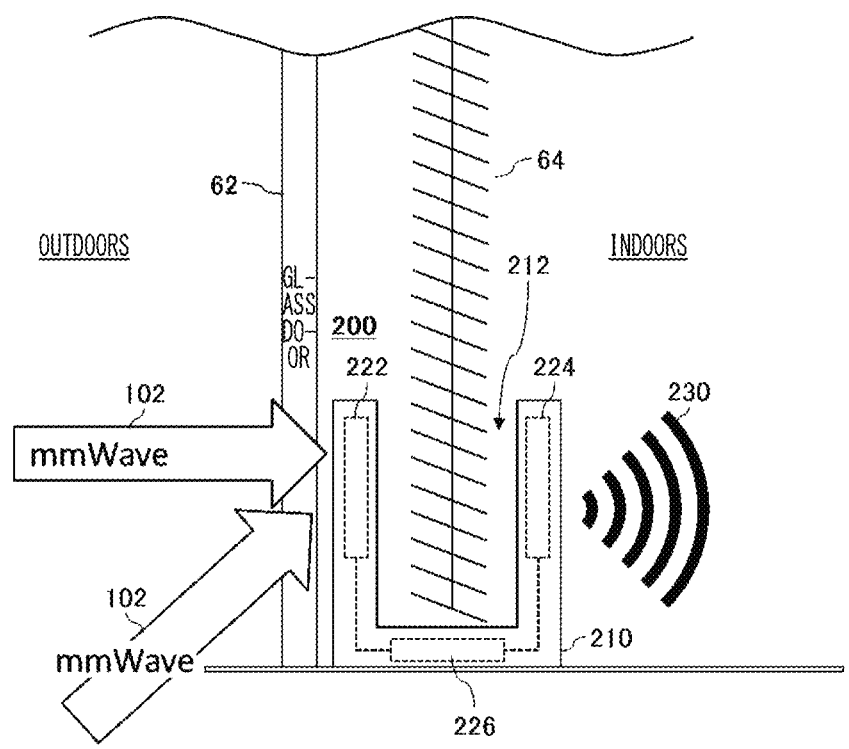
FIG. 13 schematically shows an example of a relay device 200.

FIG. 13 schematically shows an example of a relay device 200. The relay device 200 according to the present embodiment relays the communication between the base station 100 and the indoor UE 500. The relay device 200 may be the UE relay. Further, the relay device 200 may be the CPE.

The relay device 200 includes a donor antenna 222 that is an antenna for connecting to a base station 100 side, and a service antenna 224 that is an antenna for covering an indoor side. Further, the relay device 200 includes a relay processing unit 226 that causes a signal, which is propagated by the radio wave received by the donor antenna 222, to be propagated to the service antenna 224.

The relay device 200 includes a housing 210 having therein the donor antenna 222, the service antenna 224, and the relay processing unit 226. The donor antenna 222 and the service antenna 224 are arranged to be separated from each other by a cavity 212 into and from which an obstacle to the radio wave can be inserted and removed, the obstacle being an obstacle to the radio wave propagation. In FIG. 13, a venetian blind 64 is illustrated as the obstacle to the radio wave. As shown in FIG. 13, the housing 210 has a U-shape. The housing 210 may have a U-shaped cross section. The cavity 212 is located in a U-shaped recess of the housing 210.

In the example shown in FIG. 13, the relay device 200 is arranged indoors inside a glass door 62. The relay device 200 may be arranged such that the donor antenna 222 is located between the glass door 62 and the venetian blind 64, and the service antenna 224 is located on the indoor side further than the venetian blind 64.

The beam 102 that reaches the glass door 62 is, for example, the beam 102 that is emitted by the base station 100 toward the building. Further, the beam 102 that reaches the glass door 62 is, for example, the beam 102 that is emitted by the base station 100 toward the road facing the building to be rough-surface-scattered by the road surface of the road. Further, the beam 102 that reaches the glass door 62 is, for example, the beam 102 that is emitted by the base station 100 to be specularly reflected by the road surface, the building wall surface, and the like. The beam 102 emitted by the base station 100 reaches the glass door 62 by the line-of-sight propagation, the specular reflection by the road, building wall surface, and the like, the rough surface scattering, and the like.

The beam 102 of the millimeter wave passes through the glass door 62, and thus penetrates indoors when the venetian blind 64 is not installed. However, when the venetian blind 64 is installed, the beam 102 has a loss due to the venetian blind 64. In particular, when the venetian blind 64 is made of steel and is in a state of being completely closed, a very great loss occurs and the indoor UE 500 is not able to establish a stable wireless link with the base station 100.

In contrast to this, with the relay device 200 according to the present embodiment, the beam 102 is received by the donor antenna 222 arranged between the glass door 62 and the venetian blind 64, the signal propagated by the beam 102 is emitted indoors by a radio wave 230 of the service antenna 224, and thus the loss due to such a venetian blind 64 can be eliminated.

The donor antenna 222 may be a beam steering antenna. The donor antenna 222 may orient a pointing direction of the antenna toward a direction of arrival of the beam 102.

The service antenna 224 may output a radio wave in a frequency band different from that of the millimeter wave. The service antenna 224 may be an antenna of a WiFi access point. Further, the service antenna 224 may be an antenna of a 5G base station. Further, the service antenna 224 may be an antenna of an LTE base station. The service antenna 224 may be an antenna of the LTE base station, or an antenna of the 5G base station that outputs a radio wave from a 3.6 GHz band to a 4.2 GHz band, which is said to be difficult to use outdoors in a wide range due to a problem of the interference with satellite communication.

The donor antenna 222 and the service antenna 224 may use the same frequency. In this case, the relay device 200 may cause a HetNet (Heterogeneous Network) function to be operated to avoid the radio wave interference between a donor side and a service side.

Figure 14:
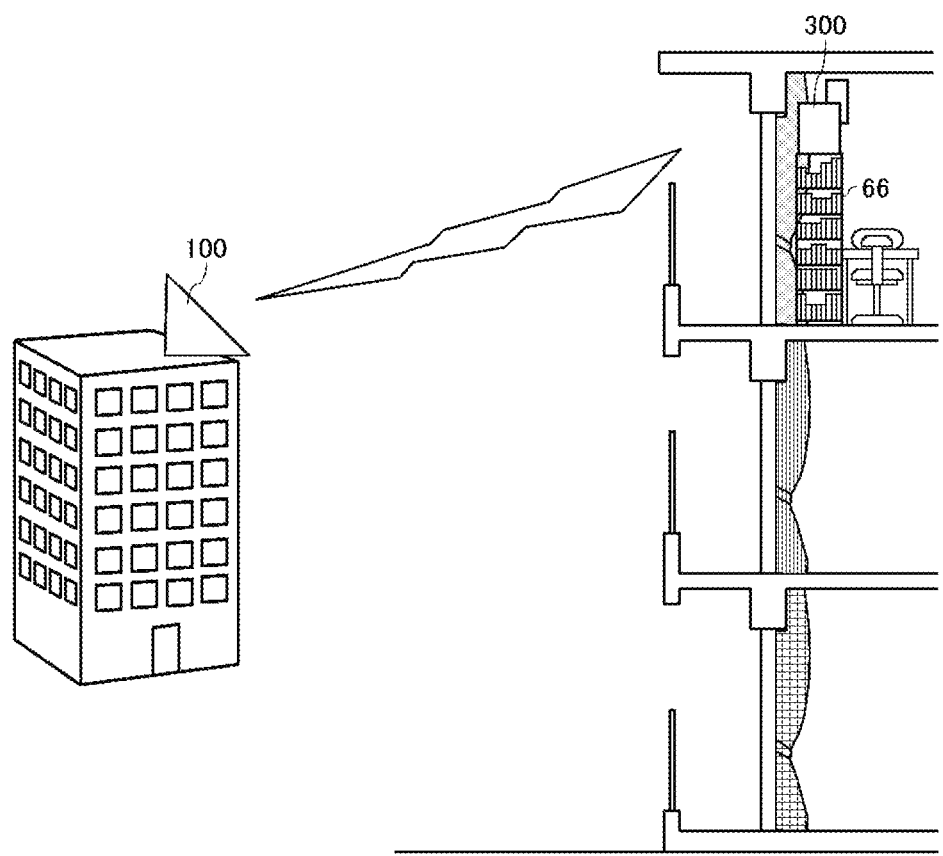
FIG. 14 schematically shows an example of a relay device 300 for a condominium.

FIG. 14 schematically shows an example of a relay device 300 for a condominium. In the condominium, the relay device 300 is placed at a location where the base station 100 can be seen, such as on a bookshelf 66.

Figure 15:
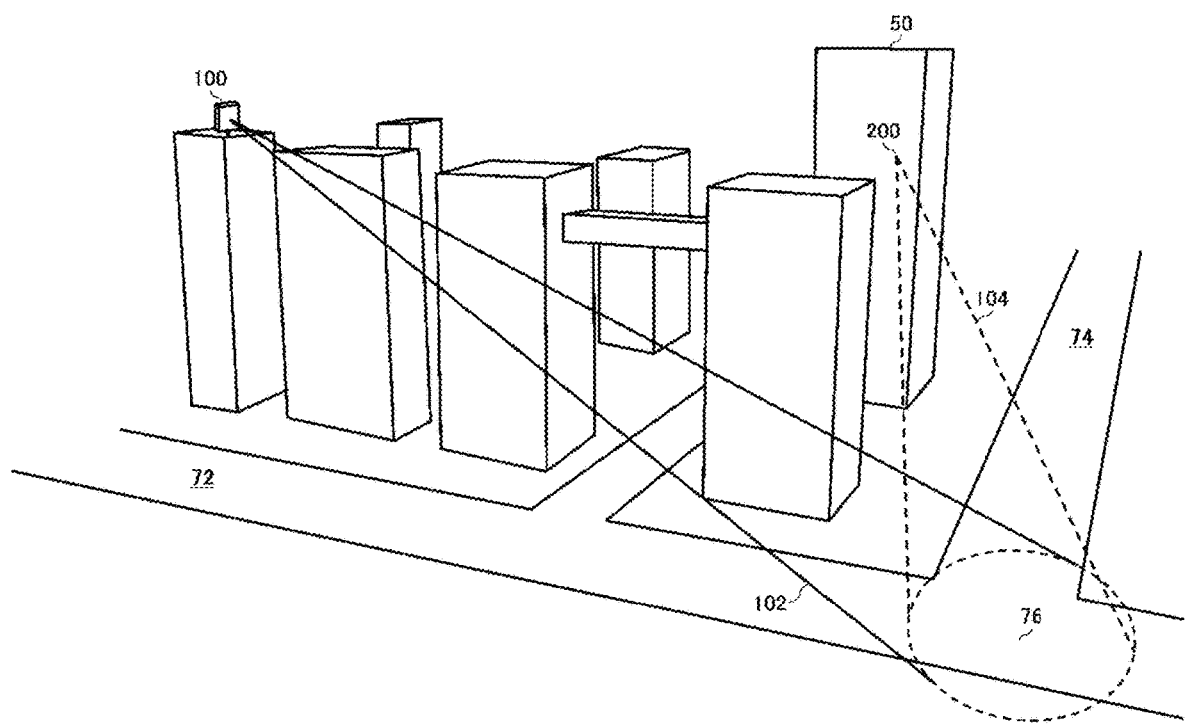
FIG. 15 schematically shows an example of a reception environment in which the relay device 200 having a beam steering antenna with a high gain receives radio wave emitted by the base station 100.

FIG. 15 schematically shows an example of a reception environment in which the relay device 200 having a beam steering antenna with a high gain receives radio wave emitted by the base station 100. In the example shown in FIG. 15, when the base station 100 is not installed on a road 74 side, by receiving the rough-surface-scattered radio wave, of the beam 102 which is emitted by the base station 100 on a road 72 side, by a road surface 76, the relay device 200 installed in the building 50 may relay the signal transmitted by the base station 100 to the building 50 indoors.

Figure 16:
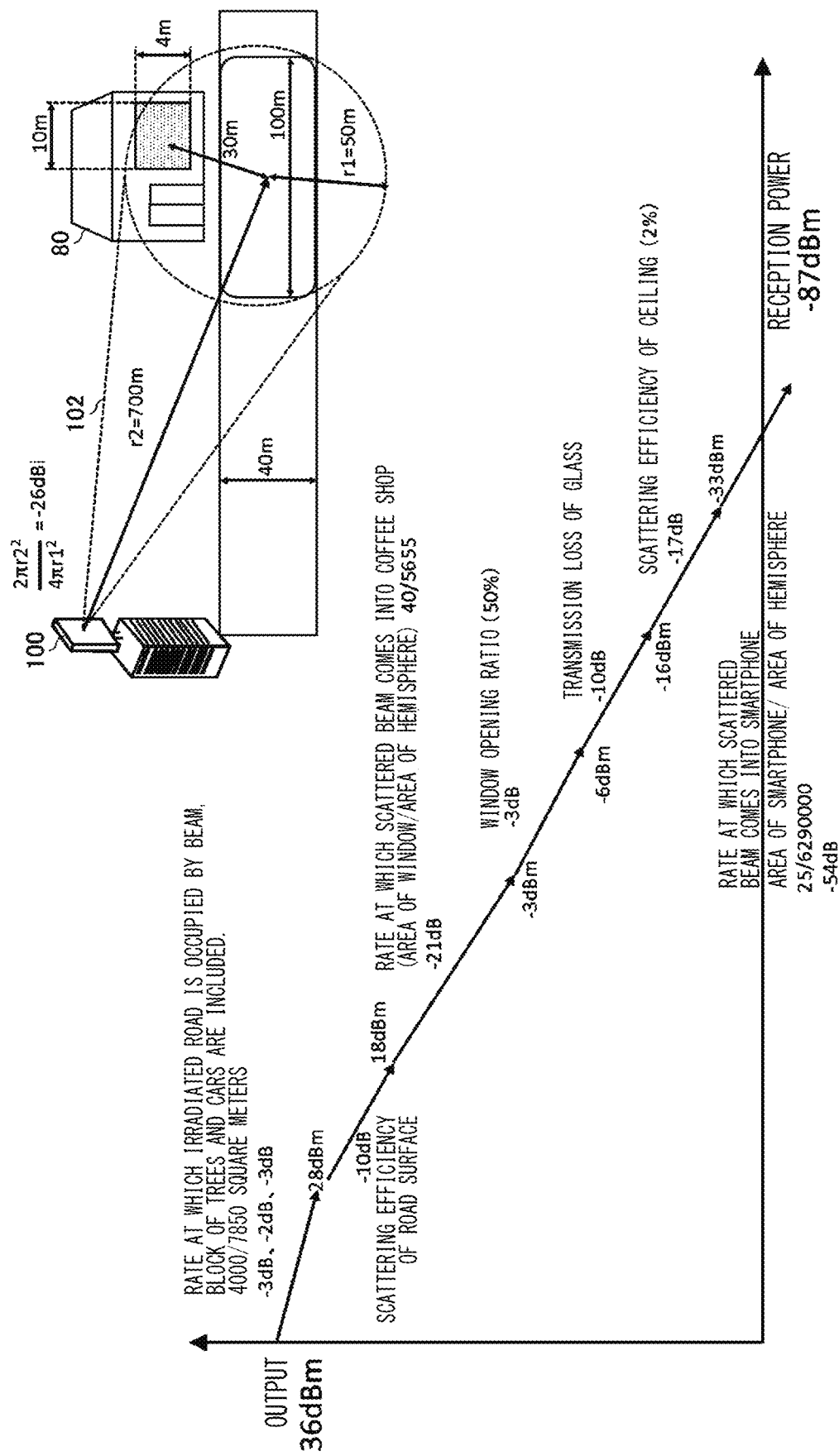
FIG. 16 schematically shows an example of a link budget for rough surface scattering.

FIG. 16 schematically shows an example of a link budget for rough surface scattering. Here, an example of the link budget when a smartphone (smartphone) in a coffee shop 80 receives the beam 102 output by the base station 100 is shown.

The radio wave output by the base station 100 is attenuated by a factor such as a rate at which the irradiated road is occupied by the beam 102, a rate at which the scattered beam 102 comes into the coffee shop 80, a window opening ratio, a transmission loss of glass, a scattering efficiency of a ceiling, and a rate at which the scattered beam comes into the smartphone, and is received by the smartphone. However, as shown in FIG. 16, theoretically, it is possible to realize reception power to withstand practical use.

Figure 17:
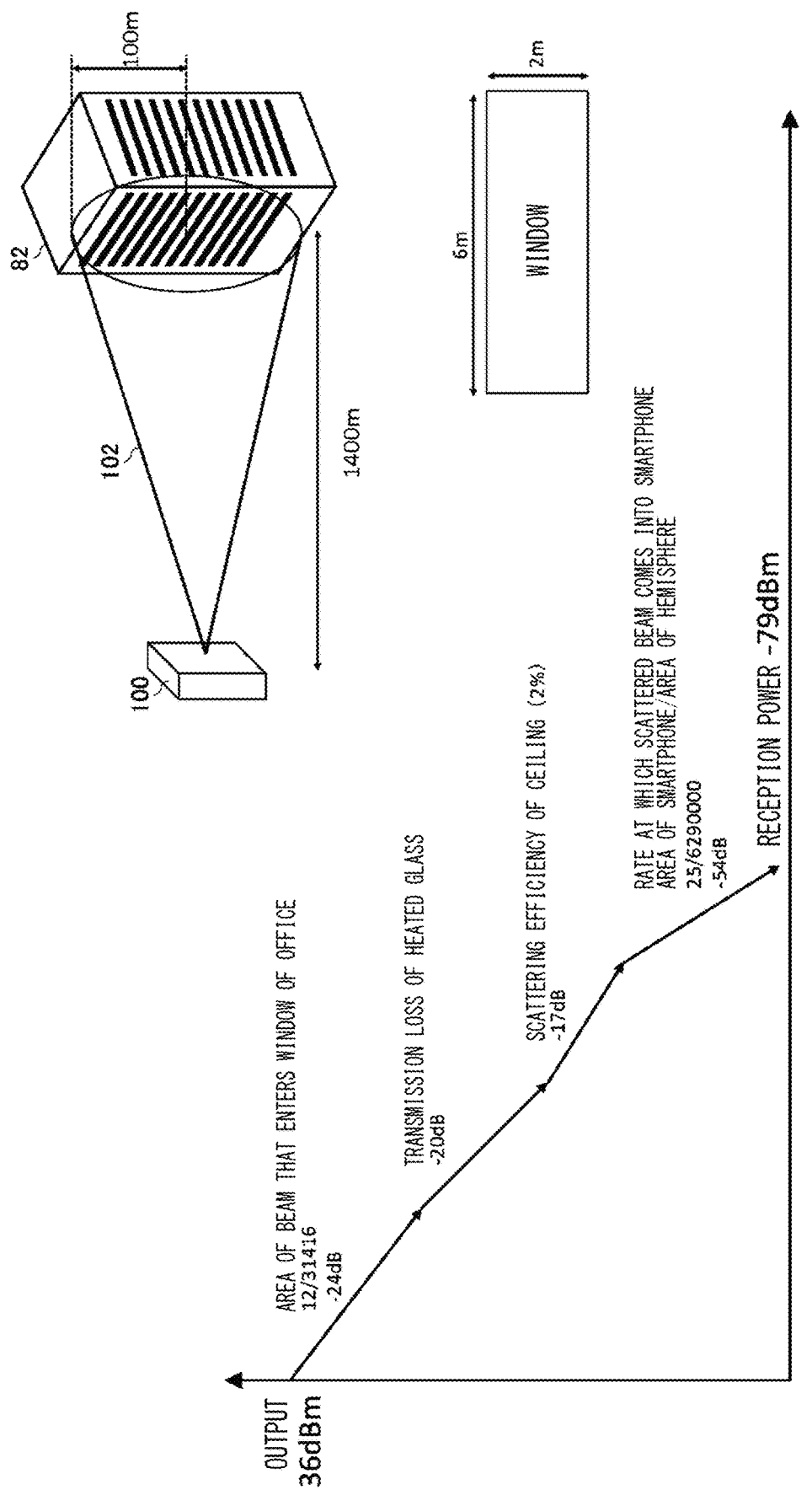
FIG. 17 schematically shows an example of a link budget between a base station and a building window in a LOS.

FIG. 17 schematically shows an example of a link budget for a LOS. Here, an example of the link budget when a smartphone in an office 82 receives the beam 102 output by the base station 100 is shown. Here, a case where the office window has a size of 6 m×2 m, and heated glass is used will be described as an example.

The radio wave output by the base station 100 is attenuated by a factor such as an area of the beam 102 that enters a window of the office 82, a transmission loss of heated glass, a scattering efficiency of a ceiling, and a rate at which the scattered beam comes into the smartphone, and is received by the smartphone. However, as shown in FIG. 17, theoretically, it is possible to realize reception power to withstand practical use.

Figure 18:
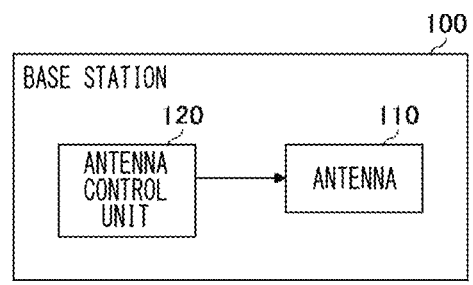
FIG. 18 schematically shows an example of a functional configuration of the base station 100.

FIG. 18 schematically shows an example of a functional configuration of the base station 100. The base station 100 includes an antenna 110 and an antenna control unit 120.

The antenna 110 emits the beam 102 of the millimeter radio wave in a designated direction. The antenna 110 may emit the beam 102 in any frequency band of the millimeter wave. The antenna 110 emits, for example, the beam 102 in the 28 GHz band. Further, the antenna 110 emits, for example, the beam 102 from the 60 GHz band to the 80 GHz band. The antenna 110 may emit the beam 102 in the 60 GHz band. The antenna 110 may emit the beam 102 in the 76 GHz band. The antenna 110 may emit the beam 102 in the 80 GHz band. The antenna 110 may form the beam 102 by a GoB (Grid of Beam) method rather than an EBB (Eigenvalue Based Beamforming) method.

The antenna control unit 120 controls the antenna 110. For example, the antenna control unit 120 controls the antenna 110 such that a peak of the beam 102 formed by the antenna 110 is located on the road surface of the road. The antenna control unit 120 may control the antenna 110 such that the peak of the beam 102 formed by the antenna 110 is located on the road surface of the asphalt road.

In order to form the communication area in the building of the roadside, the antenna control unit 120 may control the antenna 110 such that the peak of the beam 102 formed by the antenna 110 is located on the road surface of the road where the building exists. The antenna control unit 120 may be able to form the communication area by the rough-surface-scattered radio wave by the road surface of the road.

The system 10 according to the present embodiment may include the plurality of base stations 100 and a plurality of relay devices including antennas having directivity on the road surface of the road where the peak of the beam emitted by the base station 100 is located. The relay device included in the system 10 according to the present embodiment may be the relay device 200. Further, the relay device included in the system 10 according to the present embodiment may be the relay device 300.

The system 10 according to the present embodiment may adopt a station installation design which also includes beams directly incident on the middle floors and the upper floors of the building without tilting the beams down when the radio wave is emitted toward the direction of a road extension, rather than a design in which only the feet of the base station 100 is set as the coverage area.

The antenna control unit 120 may cause the antenna 110 to emit the beam 102 toward the building. The antenna control unit 120 may cause the antenna 110 to directly emit the beam 102 toward the building. The antenna control unit 120 may control the antenna 110 such that the beam 102 does not miss the building.

The base station 100 may further include a direction acquisition unit (not shown) that acquires a direction of the satellite space station or the earth station by setting the base station 100 as a starting point. The direction acquisition unit may store location information of the satellite space station and location information of the earth station in advance, and may acquire the direction from the location information of these and the location information of the base station 100. The antenna control unit 120 may control the antenna 110 such that the beam 102 formed by the antenna 110 is not oriented toward the direction acquired by the direction acquisition unit. From among multiple beams 102, for example, the antenna control unit 120 selects, as the beam 102 not to use, the beam 102 whose direction matches the direction acquired by the direction acquisition unit, and selects, as the beam 102 to use, the beam 102 whose direction does not match the direction acquired by the direction acquisition unit.

The base station 100 may have the power amplifier including the CMOS, and may output the radio wave in the frequency bandwidth higher than the 28 GHz band, in a power range that does not exceed the application limit of the CMOS.

The base station 100 may be installed at a location as high as possible to ensure the LOS (Line of Sight). For example, the base station 100 is installed at a location higher than a predetermined height. Then, the base station 100 may construct the communication area in the LOS or a semi LOS by emitting the beam 102, by the GoB method, from the location higher than the predetermined height toward the direction of a road extension.

The base station 100 may be installed in the building. When installed in a building located at a crossroad, the base station 100 may have a sector configuration of two sectors or four sectors in the direction of a road extension. When installed in a building located at a three-way junction, the base station 100 may have a sector configuration of three sectors. The base station 100 constructs the coverage area by a scheme completely different from that of a typical repetitive three-sector station installation.

From the base station 100, energy may be concentrated on a single beam rather than multiple beams are emitted. This makes it possible to ensure the link budget and deliver a communication service to the inside of the building.

For a front end circuit configuration of the base station 100, the digital pre-coding circuit may be eliminated by adopting beam-forming of the GoB method rather than beam-forming of the EBB method, without having a digital pre-coding circuit for emitting the multiple beams in front of an analog front end. This makes it possible to reduce a cost.

As a wireless device of the base station 100, a wireless device that supports a MIMO, but does not support a Massive MIMO, thereby omitting the digital pre-coding circuit and that is connected to a PA (Power Amplifier), an LNA (Low Noise Amplifier), or a phase shifter directly from a modem may be used.

The base station 100 may be operated as an IP base station without adopting a CPRI, and further, can be operated by a single 10 GBASE SFP (Small Form Factor Pluggable) by transmitting a single beam rather than the multiple beams to suppress a communication speed.

As the base station 100, a base station that does not require a CPRI interface and a BBU (Base Band Unit) processing a plurality of antenna streams by removing the digital pre-coding circuit from the configuration of an existing wireless base station and that is operated, as an IP base station, by only a 10G IP interface may be used.

When the plurality of base stations 100 directly irradiate the buildings with the radio waves, one beam per one base station 100 may be emitted. The base station 100 may emit one beam formed by a combination of vertical polarization and horizontal polarization, or by a combination of polarization by +45 degrees and polarization by −45 degrees.

In providing the system 10 according to the present embodiment, when a street tree is planted between the building and the road that are the target coverage areas, the millimeter wave has a great loss by the street tree, and thus a second floor to a fourth floor of the building are not set as the target coverage areas, and the road-surface-scattered radio wave by the road surface or the radio wave propagating in the line of sight is incident only on other floors, thereby the communication between the U-shaped UE relay or the CPE installed in the building, and the base station 100 may be ensured.

The system 10 according to the present embodiment may execute an area construction method using a station installation design method in which when a common channel beam pattern of the base station 100 is formed, by a beam design method that sets the beam to all points in the line of sight, other than midair, regardless of the building wall surface, the road surface, or a building rooftop surface as long as the beam does not hit the midair, based on a view photo taken from the base station 100 at a time of installing the base station 100, the rough-surface-scattered wave and a specularly reflected wave by the road surface or the rough wall surface are added to the U-shaped UE relay or the CPE including the beam steering antenna with a high gain, or the U-shaped UE relay or the CPE including a receive-only beam steering antenna with a higher gain, and maximum coverage is ensured.

The system 10 according to the present embodiment may execute an area construction method for ensuring a stable link budget by using the rough surface scattering, the reflected wave, and the like by the road surface or the rough wall surface far away (being far away makes it possible to target a wide area in a pinpoint manner), by using a DL (Down Link) only link which is predicted to be specified in the future by Release 17 of 3GPP or the like, and by using the U-shaped UE relay or the CPE including a receive-only beam steering antenna with a higher gain (30 dBi or the like).

In the system 10 according to the present embodiment, when the UE relay is to be placed in a residential or small office condominium, a user of the UE 500 may install the UE relay by themself at a place where a strength of a received radio wave of the UE relay is the strongest in a formation made by using the fact that the radio wave, which is emitted from the base station 100 to enter through the window of the condominium, is reflected once by Lambertian reflection on a ceiling of a room.

The base station 100 in the system 10 according to the present embodiment fundamentally has a two sector configuration, but when the beam is emitted to the middle floors or the upper floors of the building as a target, the base station may adopt an area construction method of a three sector configuration to add one sector targeting the middle floors or the upper floors in addition to the above-described two sectors, in which the building is irradiated in two or three directions from a vicinity, thereby setting the inside of the building as a coverage area, while the beam is not oriented in a direction that is not a direction in which the building is standing so that a continuous coverage area is not constructed. For an area with dense buildings, a two or four sector configuration may be adopted on a broad street, and a narrow road may be given up not to be set as the coverage area.

In the system 10 according to the present embodiment, the coverage may be calculated only in consideration of a target area, since the 28 GHz band is characterized in that the suburban region and an area outside the line of sight such as a narrow back road are not set as the target area, which makes it necessary to change a way of thinking about the coverage in a conventional frequency band of 6 GHz or less.

A provider, such as a telecommunications carrier that provides the system 10 according to the present embodiment, may do business after checking whether there is the line of sight from the base station 100 with a tool such as a satellite photo map in advance when installing, on the middle floors or the upper floors, the U-shaped UE relay or the CPE used for the system 10 according to the present embodiment. Alternatively, the CPE or the UE relay may be installed at a place where a quality is good after checking of a result of installation on each of four sides of the building before a start of the business.

In the system 10 according to the present embodiment, the radio wave emitted from the base station 100 may be reflected once or twice by the rough wall surface of the building to reach the area outside the line of sight, so as to be received by the UE relay with a beam oriented in an upward direction above the horizon, and this makes it possible to reduce effects of a car and a pedestrian traveling on the ground, and to enhance the quality of communication.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 system, 20 building, 30 building, 32 window, 40 condominium, 50 building, 52 window, 62 glass door, 64 venetian blind, 66 bookshelf, 72 road, 74 road, 76 road surface, 80 coffee shop, 82 office, 90 satellite space station, 100 base station, 102 beam, 104 scattered radio wave, 106 beam pattern, 108 beam, 110 antenna, 120 antenna control unit, 200 relay device, 210 housing, 212 cavity, 222 donor antenna, 224 service antenna, 226 relay processing unit, 230 radio wave, 300 relay device, 500 UE, 700 millimeter wave network, 710 radio wave

What is claimed is:

1. An area construction method for providing a 5G mobile wireless communication network service (hereinafter, referred to as a 5G service) using a millimeter wave, the area construction method wherein a wireless communication area is constructed by using line-of-sight propagation of a radio wave which is emitted by using a beam-forming technology from a base station, and rough surface scattering of the radio wave by a road surface and a rough wall surface, rather than by using a diffraction phenomenon of the radio wave which causes a large loss;
an outdoor coverage area is constructed by the radio wave which is propagated through paths of the line-of-sight propagation of a beam aligned in a road direction, specular reflection by the road surface and a wall surface, and the rough surface scattering by the road surface and the rough wall surface; and
an indoor coverage area is constructed by the radio wave which is propagated by the line-of-sight propagation, the specular reflection, and the rough surface scattering being reflected or scattered in a direction to an inside of a building.

2. The area construction method according to claim 1, wherein
the radio wave with a beam shape is emitted by a GoB (Grid of Beam) method from the base station in a direction of a road extension, the radio wave reflected or scattered in the direction to the inside of the building of a roadside via the line-of-sight propagation of the radio wave, the specular reflection of the radio wave by a building wall surface and the road surface, and the rough surface scattering of the radio wave by the road surface and the rough wall surface is received by a U-shaped UE (User Equipment) relay or CPE (Customer Premises Equipment) that is installed at a window area of the building and that is equipped with a beam steering antenna, and the UE relay or the CPE is operated as a WiFi access point, a 5G base station, or an LTE (Long Term Evolution) base station, thereby constructing the indoor coverage area; and
the U-shaped UE relay or the CPE includes UE of a millimeter wave 5G and Sub 6 GHz by a window side, and includes a WiFi antenna, or a 4G or 5G femto base station on an inside on an opposite side, and the U-shape is to avoid an influence of a metal venetian blind, and is an open space into which the venetian blind is capable of being pulled down.

3. The area construction method according to claim 2, wherein by using an LTE or 5G system of 3.6 GHz to 4.2 GHz, which is said to be difficult to use in a wide range outdoors due to a problem of interference with satellite communication, for a frequency of the radio wave which is output to an indoor service side of the UE relay, compatibility with the satellite communication is enabled.

4. The area construction method according to claim 2, wherein when a donor side and a service side use the same frequency, the UE relay causes a HetNet (Heterogeneous Network) function to be operated to avoid a radio wave interference between the donor side and the service side.

5. The area construction method according to claim 2, wherein when there is an outdoor space such as a balcony in a residential or small office condominium, the UE relay has a beam steering antenna on an outside of a U-shaped hanger of a flower-pot type UE relay having a shape to be hooked on a handrail.

6. The area construction method according to claim 2, wherein when the U-shaped UE relay or the CPE is to be placed in a residential or small office condominium, a customer performs installation by themself at a place where a strength of a received radio wave of the UE relay or the CPE is the strongest either by directly using the radio wave, which is emitted from the base station to enter through a window of the condominium, or by using the fact the that the radio wave is reflected once by Lambertian reflection on a ceiling of a room.

7. The area construction method according to claim 1, wherein in order to provide the 5G service using the millimeter wave for the insides of middle floors and upper floors in a high-rise building, a direct wave of the millimeter radio wave is radiated to the high-rise building, thereby causing the radio wave to penetrate the inside of the building by using a U-shaped UE relay or CPE.

8. The area construction method according to claim 1, wherein a beam of the millimeter radio wave is radiated toward a road surface by using a beam-forming function of the base station according to a 5G specification to realize indoor coverage directly, or by using a U-shaped UE relay or (Customer Premises Equipment) CPE, by causing the radio wave to enter into a building through an open window of a store on a roadside by using a property that the millimeter wave is rough-surface-scattered by the road surface and the rough wall surface.

9. The area construction method according to claim 1, wherein
the road surface is asphalted; and
besides constituting a donor to a U-shaped UE relay or CPE by intentionally applying, to the road surface, the radio wave in a frequency bandwidth higher than a 28 GHz band, which has a good efficiency of the rough surface scattering, in a frequency range that does not exceed an application limit of a CMOS used for a power amplifier of the base station, and causing the radio wave to be scattered by the rough surface, a direct link to a mobile terminal can also be established.

10. The area construction method according to claim 9, wherein the base station outputs a radio wave in at least any bandwidth of 66 GHz band, 76 GHz band, 80 GHz band, or 90 GHz band.

11. The area construction method according to claim 1, wherein a coverage area in a LOS (Line of Sight) or a semi LOS is constructed by emitting a beam, by a GoB method, from the base station installed on a top of a building toward a direction of a road extension to ensure the LOS without using street propagation.

12. The area construction method according to claim 1, which is of a scheme that is completely different from a typical repetitive three-sector station installation, wherein the base station is installed in a building; and
the base station installed in a building located at a crossroad has a sector configuration of two sectors or four sectors in a direction of a road extension, and the base station installed in a building located at a three-way junction has a sector configuration of three sectors.

13. The area construction method according to claim 1, wherein in setting an area to be a target coverage area, an urban center where there are many tall buildings, a vicinity of the urban center, or a super rural area where trees are not planted are set as a target, and a suburban region is not set as the target coverage area.

14. The area construction method according to claim 1, wherein when the radio wave is emitted from the base station toward a high-rise building, a range of a beam emitted from the base station is selected in accordance with a shape of the high-rise building so as not to cause interference to a satellite space station and an earth station.

15. The area construction method according to claim 1, wherein a station installation design method which ensures maximum coverage is used, in which, when a common channel beam pattern of a base station is formed, by a beam design method that sets a beam to all points in a line of sight, other than midair, regardless of a building wall surface, a road surface, or a building roof top surface as long as the beam does not hit the midair, based on a view photo taken from the base station at a time of installing the base station, a rough-surface-scattered wave by the road surface and a specularly reflected wave by the road surface, a wall surface, or the like are added to a U-shaped UE relay or CPE including a beam steering antenna with a high gain, or the U-shaped UE relay or the CPE including a receive-only beam steering antenna with a higher gain.

16. The area construction method according to claim 1, wherein a stable link budget is ensured by using rough surface scattering, a reflected wave, and the like by a road surface or a rough wall surface far away (being far away makes it possible to target a wide area in a pinpoint manner), by using a DL (Down Link) only link which is predicted to be specified in the future by Release 17 of 3GPP or the like, and by using a U-shaped UE relay or CPE including a receive-only beam steering antenna with a higher gain (30 dBi or the like).

17. The area construction method according to claim 1, wherein when a street tree is planted between a building and a road that are target coverage areas, a second floor to a fourth floor of the building are not set as the target coverage areas, and the rough-surface-scattered wave by the road surface or the rough wall surface, or the radio wave propagating in the line of sight is incident only on other floors, thereby ensuring a communication between a U-shaped UE relay or CPE installed in the building, and the base station.

18. The area construction method according to claim 1, wherein decluttering is executed, in which, at an urban center, a busy main street is covered vertically and horizontally in a grid pattern, and other than a building facing a street that is a target coverage area, no area is set as a coverage area, in principle.

19. The area construction method according to claim 1, wherein, a station installation is designed to also include beams directly incident on middle floors and upper floors of a building without tilting the beams down even when the radio wave is emitted toward a direction of a road extension, rather than being designed to set only the feet of the base station as a coverage area.

20. The area construction method according to claim 1, wherein the base station fundamentally has a two sector configuration, but when a beam is emitted to middle floors or upper floors of a building as a target, a three sector configuration having one sector targeting the middle floors or the upper floors added in addition to the two sectors is adopted, and the building is irradiated in two or three directions from a vicinity, thereby setting an inside of the building as a coverage area, while the beam is not oriented in a direction that is not a direction in which the building is standing so that a continuous coverage area is not constructed.

21. The area construction method according to claim 1, wherein coverage is calculated only in consideration of a target area since a 28 GHz band is characterized in that a suburban region and an area outside a line of sight such as a narrow back road are not set as the target area, which makes it necessary to change a way of thinking about the coverage in a conventional frequency band of 6 GHz or less.

22. The area construction method according to claim 1, wherein the radio wave, which is emitted from the base station, is reflected once or twice by a wall surface of a building to reach an area outside a line of sight, and is received by a U-shaped UE relay or (Customer Premises Equipment) CPE that with a beam oriented in an upward direction above a horizon, thereby reducing effects of a car and a pedestrian traveling on the ground to enhance a quality of a communication.

* * * * *